United States Patent [19]

Ayscue

[11] Patent Number: 4,724,279
[45] Date of Patent: Feb. 9, 1988

[54] SELF-RIGHTING COMMUNICATION TERMINAL

[76] Inventor: Larry C. Ayscue, 210 Woodbine Dr., Louisburg, N.C. 27549

[21] Appl. No.: 881,733

[22] Filed: Jul. 3, 1986

[51] Int. Cl.$^4$ ............................................. H02G 9/00
[52] U.S. Cl. ...................................... 174/38; 40/608; 248/160; 248/623; 248/900; 404/10
[58] Field of Search ......................... 174/37, 38, 45 R; 40/608; 52/113; 248/160, 548, 622, 623, 900; 404/10, 11

[56] References Cited

U.S. PATENT DOCUMENTS

| 1,487,635 | 3/1924 | Watts ..................... 40/608 |
| 3,193,227 | 7/1965 | Czerwinski ............ 248/623 X |
| 3,279,133 | 10/1966 | DeKorte ................ 404/10 X |
| 4,133,125 | 1/1979 | Lariosa ................... 40/608 |

FOREIGN PATENT DOCUMENTS

| 626097 | 10/1961 | Italy ........................... 404/10 |
| 402923 | 5/1966 | Switzerland ............... 404/10 |
| 940775 | 11/1963 | United Kingdom ........ 404/10 |

Primary Examiner—Laramie E. Askin
Attorney, Agent, or Firm—Mills & Coats

[57] ABSTRACT

This invention is a ground supported communication terminal having the ability to flex back and forth in response to an impact from a vehicle or the like so as to prevent and/or minimize damage to the terminal housing and base support structure as well as its internal components. The communication terminal is of a modular design so as to simplify the repair or replacement of parts that may be damaged as a result of a severe impact.

9 Claims, 5 Drawing Figures

SELF-RIGHTING COMMUNICATION TERMINAL

FIELD OF THE INVENTION

The present invention relates to ground supported pedestal type communication terminals, and more particularly to a communication terminal of the type that includes a flexing and yieldable upper support structure that moves in response to impact thereagainst by an object such as a moving vehicle so as to avoid or at least minimize damage to the communication terminal and the internal structure thereof.

BACKGROUND OF THE INVENTION

In an effort to increase the reliability of their network and to eliminate the unsightliness of overhead wires, many communication companies have adopted the procedure of placing their communication cables underground. Like overhead wires, these underground communication cables generally follow preexisting roads for ease of access in servicing them.

The procedure of placing the communication cables underground, however, is not without limitation. One of these limitations requires that the cable be brought above ground periodically, terminated, and routed to individual houses. These terminations are currently housed in sheet metal structures called terminals. Because the underground communication cables generally follow roads, these terminals sit relatively close to the edge of such roads. This makes the terminal susceptible to impacts from automobiles, trucks, farm equipment, mowers, and other moving objects.

As previously mentioned, these terminals are currently constructed of sheet metal. Such construction protects the driver of the vehicle in the event of an impact, but its sheet metal construction makes the terminal itself highly susceptible to being damaged or being totally destroyed by impact. For example, after an impact the terminal is usually seriously deformed or sheared from its base. In either case, the terminal must be completely replaced.

Such a replacement is costly, difficult and time consuming. The entire terminal, including the portion anchoring the terminal in the ground, must be removed. Valuable man hours and material resources are unnecessarily wasted in the replacement process. Moreover, the service provided by the terminal is interrupted, and the affected customers are inconvenienced.

SUMMARY AND OBJECTS OF THE INVENTION

The present invention, a flexible ground-type communication terminal, addresses the problems and limitations of the current terminal technology. The flexible terminal of the present invention not only protects the driver of the impacting vehicle, but it also provides a means to protect the terminal itself. In the event that the impact is so severe that the terminal still gets damaged, the flexible terminal construction minimizes damage and simplifies the repair process.

The present invention provides a ground supported communication terminal that includes a flexible upper support structure. A metal coil spring allows the upper support structure of the terminal to flex upon impact and then to return to its normal upright position afterward. A flexible outer housing, which shields the internal cable terminations from the force of a direct impact, follows the motion of the terminal structure while it flexes and then returns to a normal upright position as well. If the force of the impact is not too great, the entire terminal will flex and return without a loss of functionality.

If the impact is severe enough to cause a loss of functionality, the invention is constructed in such a way to minimize damage and to facilitate repair.

Instead of being a unitized construction, the flexible communication terminal can be broken down into four sub-assemblies: a base structure, a flexible spring mechanism, a terminal block mounting structure and a flexible outer housing. The spring mechanism, the terminal block mounting structure and the outer housing are each replaceable independent of each other or the base structure. This modular construction allows a substantial saving of time and materials in the replacement process.

It is therefore an object of this invention to provide a communication terminal that is less susceptible to damage upon impact from a vehicle or other moving object because its structure and outer housing can flex back and forth relative to the base structure in response to the impact.

A further object of this invention is to provide a communication terminal that has a flexible outer housing which can withstand an impact from a vehicle without tearing or suffering other permanent deformation.

Another object if this invention is to provide a communication terminal whose sub-assemblies are detachably secured so that they can be repaired or replaced without replacing the entire communication terminal.

It is also an object of this invention to provide a modular communication terminal whose sub-assemblies may be repaired or replaced independent of the other sub-assemblies, especially the base structure.

Still a further object of this invention is to provide a communication terminal that has an electrical grounding circuit for the terminal blocks inherent in the structure of the communication terminal.

It is a further object of this invention to provide a communication terminal that has a protective cover over a flexible interconnection structure which allows the terminal structure to flex back and forth without damaging the communication cables contained within the terminal.

It is also an object of this invention to provide a flexible communication terminal whose outer housing is both flexible and sealed to prevent nesting by insects and animals.

A further object of the present invention is to provide a ground and pedestal-type flexible communication terminal of the character referred to above that can be used by a variety of communication utilities such as telephone companies, electric utilities, and cable television services, etc.

A specific object of the present invention is to provide a flexible communication terminal that is easy and relatively inexpensive to maintain and service.

Another object of the invention is to provide a pedestal-type communication terminal that is relatively simple and inexpensive and easy to manufacture.

Other objects and advantages of the present invention will become apparent and obvious from a study of the following description and the accompanying drawings which are merely illustrative of such invention.

FLEXIBLE COMMUNICATION TERMINAL

Figure 1:
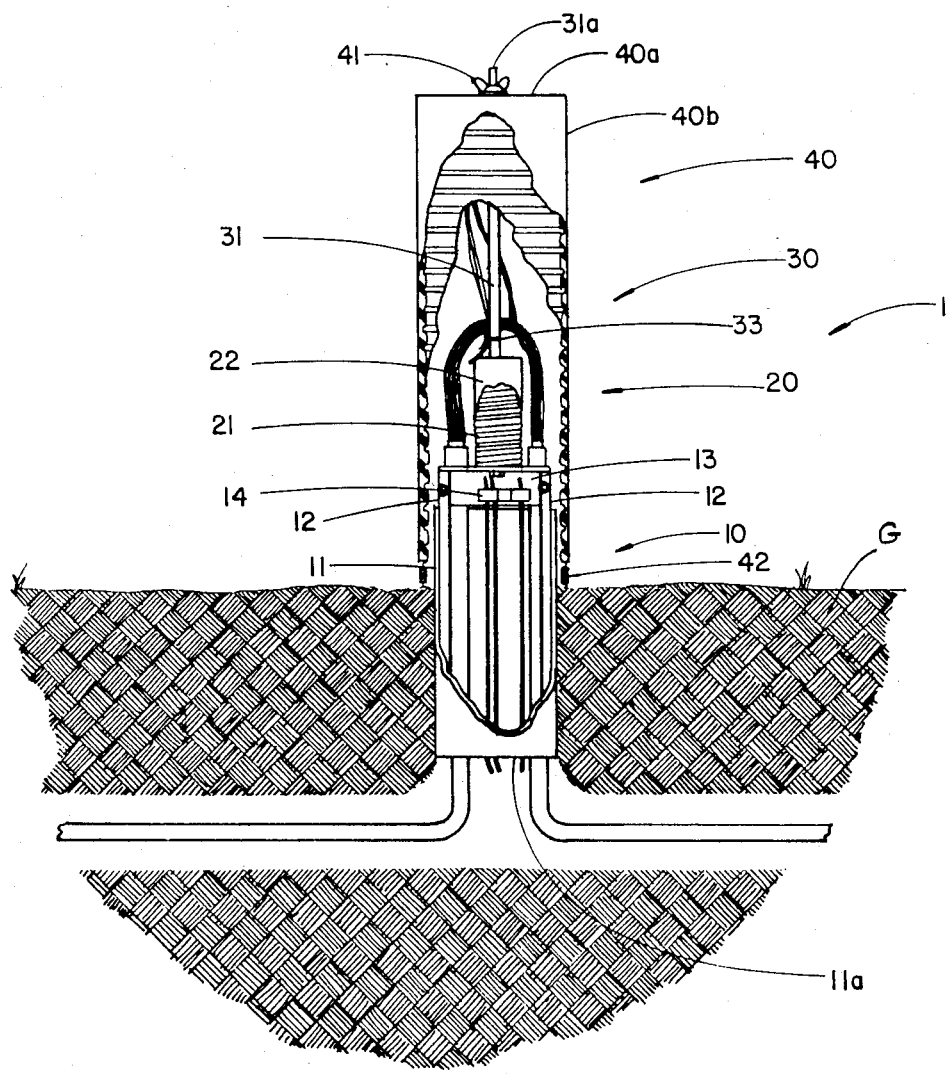
FIG. 1 is a side elevational view of the flexible communication terminal of the present invention with portions being broken away to better illustrate the base structure, flexible interconnection mechanism, terminal block mounting structure, and the flexible outer housing.
Figure 2:
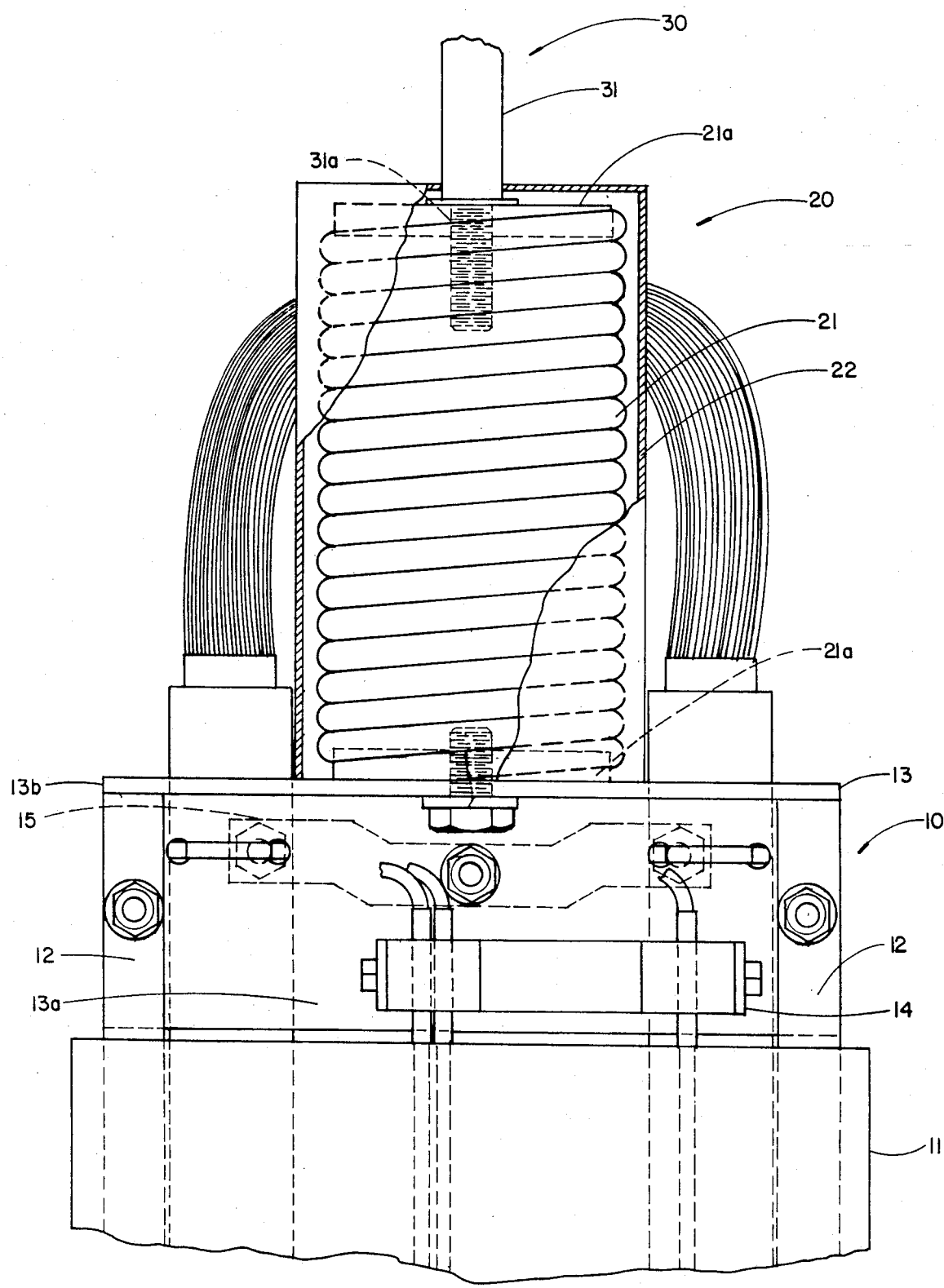
FIG. 2 shows a close-up view of the flexible interconnection mechanism, the means by which it is secured to the terminal block mounting structure and base structure, and details of the base structure sub-assembly.

With reference to the drawings, the flexible communication terminal of the present invention is indicated generally by numeral 1.

Communication terminal 1 is a modular design comprising the following detachably secured sub-assemblies: a base structure 10, a flexible interconnection mechanism 20, a terminal block mounting structure 30, and a flexible outer housing 40. An analysis of the communication terminal 1 will be presented by describing each sub-assembly.

Base structure 10 anchors communication terminal 1 into the ground G. Base structure 10 is mounted in the ground G during the installation phase of communication terminal 1 and is designed to remain in place permanently, even if communication terminal 1 is impacted by a vehicle or other moving object.

Base structure 10 comprises a cylinder 11 and an internal metal frame structure.

Cylinder 11 is an elongated structure having an open bottom 11a and an open top . Open bottom 11a allows communication cables to enter and exit communication terminal 1. The open top allows the communication cables to pass from base structure 10 upwardly to terminal block mounting structure 30. Cylinder 11 may be constructed from various materials. In the application here, it is constructed from PVC.

The metal frame structure is mounted internally with cylinder 11 and extends upwardly through the top of the cylinder. The metal frame structure includes two vertical legs 12 secured to cylinder 11. The metal frame structure further includes a mounting platform 13 secured between legs 12. Mounting platform 13 is of a right angle construction and comprises a vertical plate 13a and a horizontal plate 13b. Vertical plate 13a is mounted to the upper portion of vertical legs 12 of the metal frame. Horizontal plate 13b folds over the top of legs 12 and provides a surface upon which flexible interconnection mechanism 20 can be mounted. The metal frame structure also includes a U-shaped cable clamp 14 attached to mounting platform 13 for securing and electrically grounding cables being routed to individual houses. Finally, the metal frame structure includes a grounding strap 15 secured to mounting platform 13 which electrically grounds the shields of the communication cables to the metal frame.

Turning next to the flexible interconnection mechanism 20, it is comprised of a metal coil spring 21 and a flexible protective sheath 22.

Metal coil spring 21 has a metal end plate 21a secured in each end. End plates 21a are threaded to allow spring 21 to be detachably secured to horizontal plate 13b of mounting platform 13 and to terminal block mounting structure 30. The interposition of spring 21 between base structure 10 and terminal block mounting structure 30 allows the latter to flex relative to the former in response to the force of an impact. Spring 21 also returns communication terminal 1 to a normal upright position upon removal of the force.

Flexible protective sheath 22 is an expandable rubber-like material placed over the coils of spring 21 to protect the communication cables from damage when communication terminal 1 flexes back and forth.

Turning next to terminal block mounting structure 30, it comprises an elongated bar 31 having threads 31a at each end, at least one terminal block 32, and a wire fastener 33 for securing terminated communication cables to bar 31.

Bar 31 is mounted vertically by securing the threads 31a at the lower end thereof to the upper end plate 21a of coil spring 21. Bar 31 then serves as a surface on which to mount one or more terminal blocks 32 and to secure the terminated communication cables and flexible outer housing 40.

Terminal blocks 32 are mounted along the length of bar 31. These serve as a point to terminate the communication cables from which the terminated cables or wires are then routed to individual houses. The number of houses to be serviced determines the number of terminal blocks 32 that will be required in each particular communication terminal 1.

Fastener 33 for securing terminated communication cables is mounted at the lower end of bar 31. Fastener 33 comprises a tie wrap and a means to secure the tie wrap to bar 31. Fastener 33 prevents any tension, which may result from the flexing of the communication terminal, from stressing the communication cable terminations.

Finally, turning to the flexible outer housing 40, it is comprised of a top 40a, a flexible sidewall structure 40b, means to secure the outer housing to the terminal block mounting structure 30 and means to secure the outer housing to base structure 10. Top 40a is formed by a circular plate with a hole in the center. It may be constructed from various materials. In the present application, top 40a is composed of a hard rubber material. Sidewall structure 40b may be constructed from various materials which enable outer housing 40 to flex back and forth with terminal block mounting structure 30 in response to an impact. In the present embodiment, sidewall structure 40b includes a series of ribs separated by an expandable material. More particularly, sidewall structure 40b is constructed such that it resembles and is similar to a conventional heavy duty flexible hose such as the type found in dryer applications.

The means to secure the housing 40 to the terminal block mounting surface 30 include a wing-nut 41. Wing-nut 41 is tightened on threads 31a at the top end of terminal block mounting structure 30 after flexible outer housing 40 is disposed over the terminal block mounting structure and secures flexible outer housing 40 onto the terminal block mounting structure 30.

The means to secure flexible outer housing 40 to base structure 10 is an over-center type circular clamp 42 which tightens flexible outer housing 40 to the circumference of base structure 10. Details of over-center type circular clamp 42 are not dealt with herein because such detail is not material to the present invention and further because such devices are well known. It is sufficient to state that circular clamp 42 operates in two positions: closed so as to secure flexible outer housing 40 to base structure 10 and open so as to allow removal of flexible outer housing 40.

Under most conditions, the communication terminal sits in a normal upright position (FIG. 1) and operates much like the present art.

Figure 3:
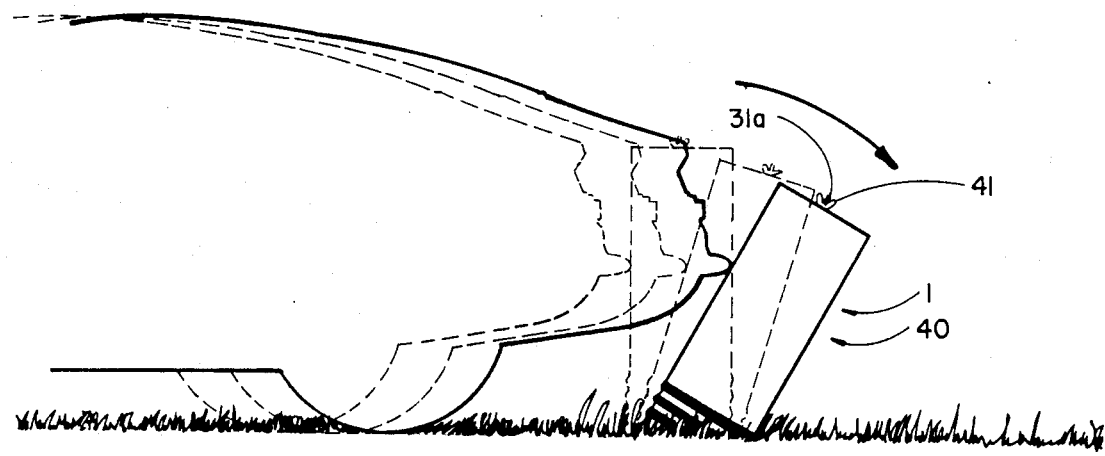
FIG. 3 depicts the communication terminal of the present invention flexing in response to the force of an impact with an automobile.

When the communication terminal 1 is struck by a vehicle or other moving object, the device responds by flexing at the coil spring 21. This allows terminal block mounting structure 30 to move in the direction of the force of the impact. Flexible outer housing 40 follows the motion of terminal block mounting structure 30 in its response to the impact (FIG. 3). Flexible protective sheath 22 covers the coils of spring 21 and prevents damage to the communication cables while this flexing motion is occurring. The force of a normal impact will not deform coil spring 21, terminal block mounting structure 30 or flexible outer housing 40.

Figure 4:
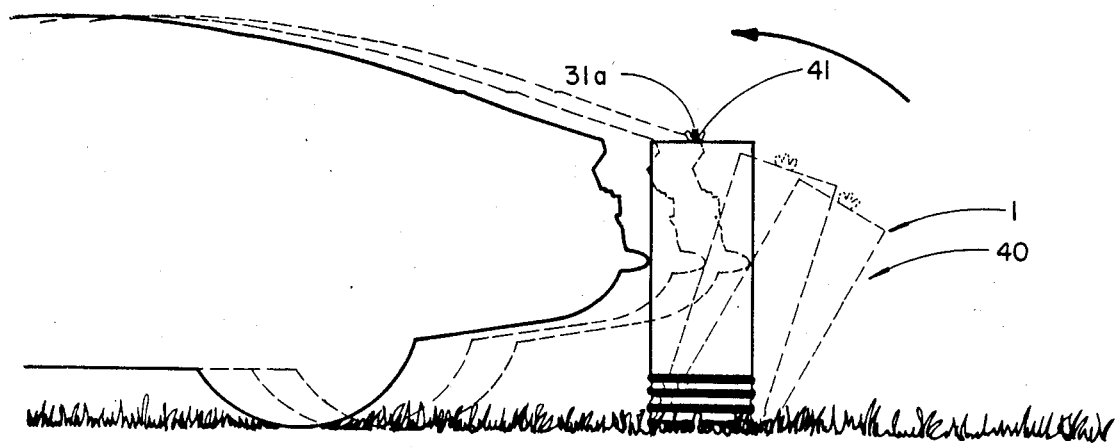
FIG. 4 depicts the communication terminal returning to a normal upright position upon the removal of the force of impact.
Figure 5:
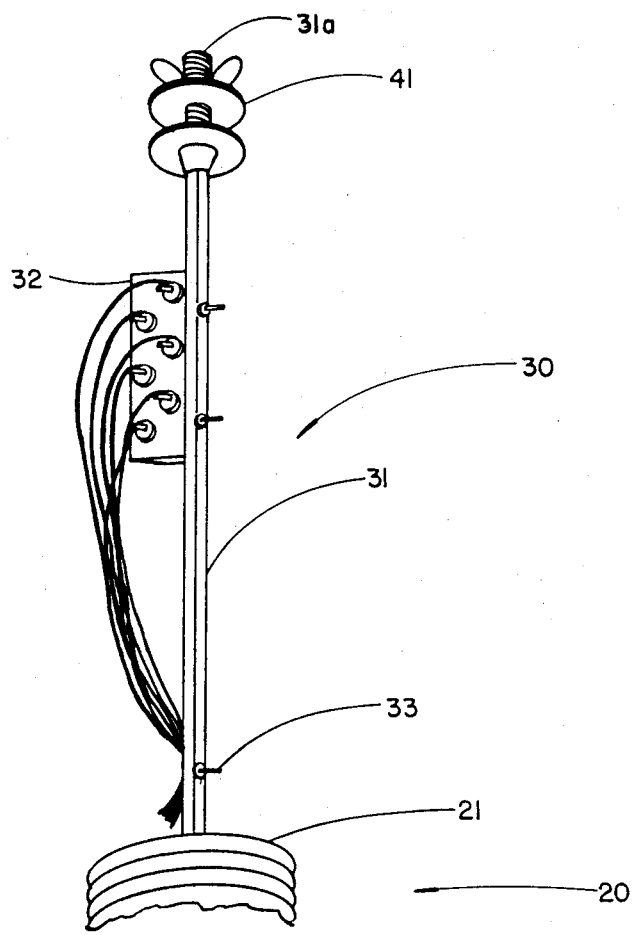
FIG. 5 is a fragmentary perspective view of the terminal block mounting structure and the terminal block mounting means therein.

Once the force of impact is removed and the energy imparted to the communication terminal 1 as a result of that impact has been dissipated, the communication terminal 1 will return to a normal upright position (FIGS. 1 and 4). No major damage to communication terminal 1 will have resulted and it will remain fully functional.

Another attractive feature of the communication terminal 1 of the present invention becomes evident in the event that a severe impact does damage the device. Communication terminal 1 herein, because of its modular design, makes repair simple. Only the damaged subassemblies or portions thereof must be replaced. Most importantly, base structure 10, which is almost never damaged, may be left untouched in the ground.

The flexible communication terminal 1 herein embodies several distinct improvements. First, the flexibility of the device which results from the interposition of coil spring 21 between base structure 10 and terminal block mounting structure 30 allows communication terminal 1 to flex in response to a normal impact and remain functional. The presence of this flexibility feature results in improved communication system reliability and reduced maintenance costs. Secondly, the modularity of communication terminal 1 simplifies the repair process in the event that the device undergoes a severe impact. Only the damaged portions of communication terminal 1 must be replaced, instead of the entire device. The modularity feature reduces both repair time and repair cost. Third, the flexible communication terminal 1 also includes an inherent structural ground. This increases the reliability of the communication system ground and, as a result, reduces the effect of noise in the communication system.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A self-righting communication terminal comprising:
   (a) a base structure anchored in the ground;
   (b) a vertical support structure extending upwardly from said base structure;
   (c) at least one communication cable terminal block mounted on said vertical support structure;
   (d) elastic interconnecting means interposed between said base structure and said vertical support structure for enabling said vertical support structure to yield in reponse to an impacting force and to return to its original condition when said impacting force is removed; and
   (e) a housing structure having a flexible wall structure enclosing said vertical support structure.

2. The communication terminal of claim 1 wherein said elastic interconnectiing includes a metal coil spring fasstened at one end to said base structure and at the opposite end to said vertical support structure.

3. The communication terminal as recited in claim 2 wherein said housing structure comprises a top and a ribbed side wall structure, said side wall structure having an expandable material between said ribs.

4. The communication terminal as recited in claim 3 wherein said vertical support structure extends upwardly from said metal coil spring through said top of said housing structure and wherein said communication terminal further includes retaining means for securing said housing structure to said vertical support structure.

5. The communication terminal of claim 2 wherein said base structure and said vertical support structure are detachably secured to said metal coil spring so that said metal coil spring and said vertical support structure can be replaced without replacing said base structure in the event that either is damaged as a result of an impact.

6. A self-righting communication terminal of the type that is designed to receive a segment of a main underground cable assembly and to provide terminal connecting points for selective wires making up the cable, said communication terminal comprising:
   (a) a base structure having an opening formed therein for permitting a cable assembly to enter and exit the communication terminal;
   (b) a vertical member extending upwardly from said base structure and normally assuming an upright postion;
   (c) at least one terminal block mounted on said vertical member for connecting selective wires of the cable assembly thereto;
   (d) a coil spring interposed between said base structure and said vertical member for enabling said vertical member to yield in response to an impacting force and to return to its original condition when said impacting force is removed;
   (e) a housing structure for enclosing said vertical member and said terminal block; and
   (f) means for securing said housing structure to said vertical member so that said housing structure moves with said vertical member in response to impacting forces and returns to its original position when said impacting forces are removed.

7. The communication terminal of claim 6 including means for detachably securing said vertical member to said coil spring.

8. The communication terminal of claim 7 including a spring mounting frame secured to said base structure, and second detachable securing means for mounting said coil spring to said spring mounting frame.

9. The communication terminal of claim 6 wherein said housing structure is disposed over said coil spring.

* * * * *